US012644318B2

(12) United States Patent
Mullins et al.

(10) Patent No.: US 12,644,318 B2
(45) Date of Patent: Jun. 2, 2026

(54) ACCESS DEVICES FOR SEMI-TRAILERS

(71) Applicant: DriverTech, LLC, Salt Lake City, UT (US)

(72) Inventors: James Robert Mullins, Centerville, UT (US); Mark C. Haslam, Bountiful, UT (US)

(73) Assignee: DriverTech, LLC, Salt Lake City, UT (US)

( * ) Notice: Subject to any disclaimer, the term of this patent is extended or adjusted under 35 U.S.C. 154(b) by 464 days.

(21) Appl. No.: 18/452,745

(22) Filed: Aug. 21, 2023

(65) Prior Publication Data

US 2024/0083205 A1      Mar. 14, 2024

Related U.S. Application Data

(60) Provisional application No. 63/404,760, filed on Sep. 8, 2022.

(51) Int. Cl.
| | |
|---|---|
| *B60D 1/60* | (2006.01) |
| *B60D 1/24* | (2006.01) |
| *B60D 1/26* | (2006.01) |
| *B60D 1/28* | (2006.01) |
| *B60R 25/01* | (2013.01) |
| *B60R 25/24* | (2013.01) |

(Continued)

(52) U.S. Cl.
CPC .............. *E05B 81/56* (2013.01); *B60D 1/242* (2013.01); *B60D 1/26* (2013.01); *B60D 1/28* (2013.01); *B60D 1/60* (2013.01); *B60R 25/01* (2013.01); *B60R 25/24* (2013.01); *B60T 13/24*

(2013.01); *E05B 81/08* (2013.01); *G07C 9/00896* (2013.01); *G07C 2009/0092* (2013.01); *H04L 67/12* (2013.01)

(58) Field of Classification Search
CPC . B60D 1/242; B60D 1/26; B60D 1/28; B60D 1/60; E05B 81/56; E05B 81/08; B60R 25/01; B60R 25/24; B60T 13/24; G07C 9/00896

See application file for complete search history.

(56) References Cited

U.S. PATENT DOCUMENTS

| | | | | |
|---|---|---|---|---|
| 206,228 | A | * | 7/1878 | Connolly ................ F16K 35/10 70/164 |
| 3,930,388 | A | * | 1/1976 | Barras .................... B60K 15/05 70/159 |

(Continued)

FOREIGN PATENT DOCUMENTS

| | | |
|---|---|---|
| CN | 206584203 U | 10/2017 |
| EP | 1312492 A2 | 5/2003 |

(Continued)

*Primary Examiner* — Jacob D Knutson
(74) *Attorney, Agent, or Firm* — Fabian VanCott; Steven L. Nichols

(57)      ABSTRACT

A coupling access device for a semi-trailer includes: a cover mechanism to cover an air hose coupling for pneumatic brakes of the semi-trailer, the cover mechanism to restrict access to the air hose coupling when in a closed position, and the cover mechanism to provide access to the air hose coupling when in an open position; a lock device to engage the cover mechanism in the closed position; and a controller to actuate the lock device to allow the cover mechanism to transition from the closed position to the open position.

19 Claims, 10 Drawing Sheets

(51) Int. Cl.

| | |
|---|---|
| *B60T 13/24* | (2006.01) |
| *E05B 81/08* | (2014.01) |
| *E05B 81/56* | (2014.01) |
| *G07C 9/00* | (2020.01) |
| *H04L 67/12* | (2022.01) |

(56) References Cited

U.S. PATENT DOCUMENTS

| | | | | |
|---|---|---|---|---|
| 4,543,984 | A * | 10/1985 | Murray | B60T 17/04 |
| | | | | 137/637.1 |
| 4,773,011 | A | 9/1988 | Vanhoose | |
| 4,784,610 | A * | 11/1988 | Stuart | H01R 13/633 |
| | | | | 174/67 |
| 5,076,077 | A * | 12/1991 | Renne | E05B 73/00 |
| | | | | 70/14 |
| 5,178,403 | A * | 1/1993 | Kemner | H02J 7/1415 |
| | | | | 322/1 |
| 5,488,352 | A | 1/1996 | Jasper | |
| 5,675,997 | A * | 10/1997 | Hulak | B60R 25/00 |
| | | | | 70/164 |
| 5,677,667 | A | 10/1997 | Lesesky | |
| 5,693,985 | A | 12/1997 | Gee | |
| 5,735,147 | A * | 4/1998 | Cattanach | B60R 25/08 |
| | | | | 70/164 |
| 5,905,433 | A | 5/1999 | Wortham | |
| 6,295,449 | B1 | 9/2001 | Westerlage | |
| 6,652,042 | B2 * | 11/2003 | Johnson | B60T 17/043 |
| | | | | 280/428 |
| 6,687,609 | B2 | 2/2004 | Hsiao | |
| 6,874,806 | B1 * | 4/2005 | Blake | B60D 1/60 |
| | | | | 280/507 |
| 7,336,159 | B2 | 2/2008 | Fackrell | |
| 7,434,643 | B2 | 10/2008 | Lesesky | |
| 7,497,529 | B2 | 3/2009 | Lesesky | |
| 8,179,238 | B2 | 5/2012 | Roberts | |
| 8,179,286 | B2 | 5/2012 | Faus | |
| 8,188,847 | B2 | 5/2012 | Roberts | |
| 8,358,205 | B2 | 1/2013 | Roberts | |
| 8,760,274 | B2 | 6/2014 | Boling | |
| 8,779,948 | B2 | 7/2014 | Faus | |
| 9,084,076 | B2 | 7/2015 | Breed | |
| 9,227,607 | B1 | 1/2016 | Ripley | |
| 9,499,109 | B2 | 11/2016 | Armacost | |
| 2005/0242930 | A1 * | 11/2005 | Nicolson | E05B 65/0075 |
| | | | | 340/426.36 |
| 2006/0192427 | A1 | 8/2006 | Lesesky | |
| 2006/0261935 | A1 * | 11/2006 | McAden | B60R 25/00 |
| | | | | 340/431 |
| 2010/0026029 | A1 * | 2/2010 | Easling | B60D 1/64 |
| | | | | 296/37.6 |
| 2011/0043342 | A1 | 2/2011 | Shepler | |
| 2011/0043343 | A1 | 2/2011 | Shepler | |
| 2016/0019497 | A1 | 1/2016 | Carvajal | |
| 2016/0052453 | A1 | 2/2016 | Nalepka | |
| 2016/0214551 | A1 | 7/2016 | Armacost | |
| 2017/0177949 | A1 | 6/2017 | Hu | |
| 2017/0240153 | A1 | 8/2017 | Ripley | |
| 2018/0181126 | A1 * | 6/2018 | Seaman | G06Q 10/08355 |
| 2019/0241030 | A1 | 8/2019 | Cyllik | |
| 2021/0061027 | A1 | 3/2021 | Da Deppo | |

FOREIGN PATENT DOCUMENTS

| | | |
|---|---|---|
| EP | 1448952 B1 | 4/2012 |
| GB | 2381915 B | 6/2005 |
| JP | 2016539039 A | 12/2016 |
| WO | 9738408 A1 | 10/1997 |
| WO | 2007038839 A1 | 4/2007 |
| WO | 2007047359 A2 | 4/2007 |
| WO | 2009143692 A1 | 12/2009 |
| WO | 2011038018 A1 | 3/2011 |

* cited by examiner

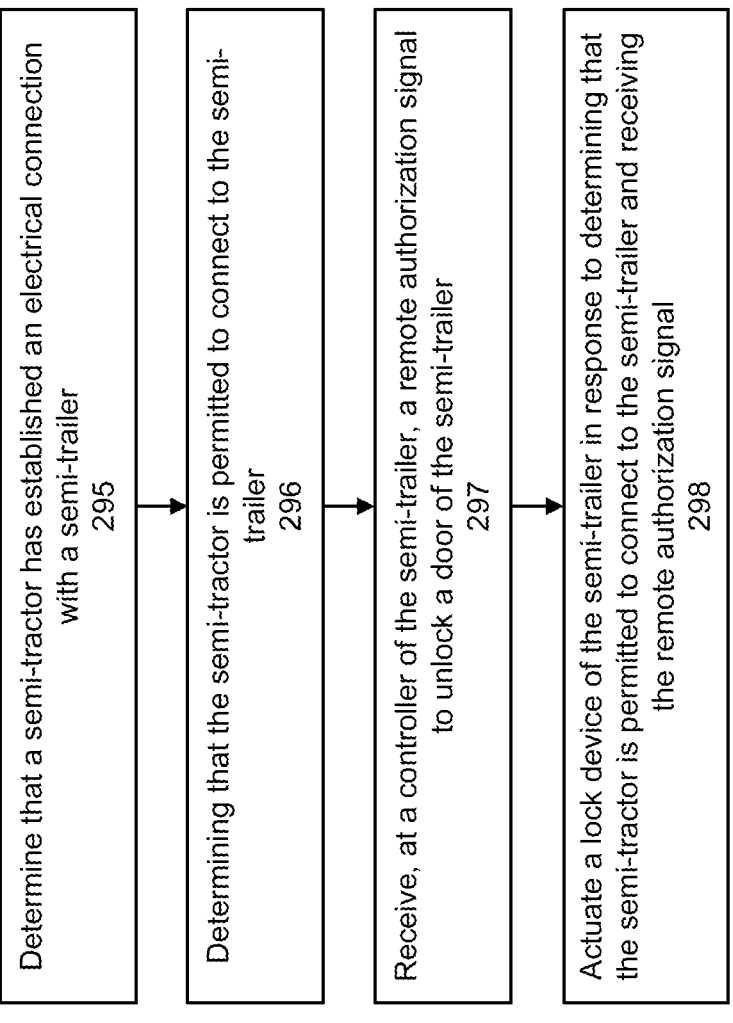

Determine that a semi-tractor has established an electrical connection with a semi-trailer
295

Determining that the semi-tractor is permitted to connect to the semi-trailer
296

Receive, at a controller of the semi-trailer, a remote authorization signal to unlock a door of the semi-trailer
297

Actuate a lock device of the semi-trailer in response to determining that the semi-tractor is permitted to connect to the semi-trailer and receiving the remote authorization signal
298

*Fig. 10*

ACCESS DEVICES FOR SEMI-TRAILERS

BACKGROUND

Trucking devices are used world-wide to deliver goods across the globe. One need not look very far to find a product that was placed in a shipping container and transported over land via a cargo truck. Given the growth of commerce worldwide, it can be presumed with certainty that the shipping industry, and specifically land-hauling tractor-trailers will play a greater and more relevant role in society.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 10 is a flow diagram illustrating a method to provide access to a door of a semi-trailer, according to an example of the principles described herein.

Figure 1:
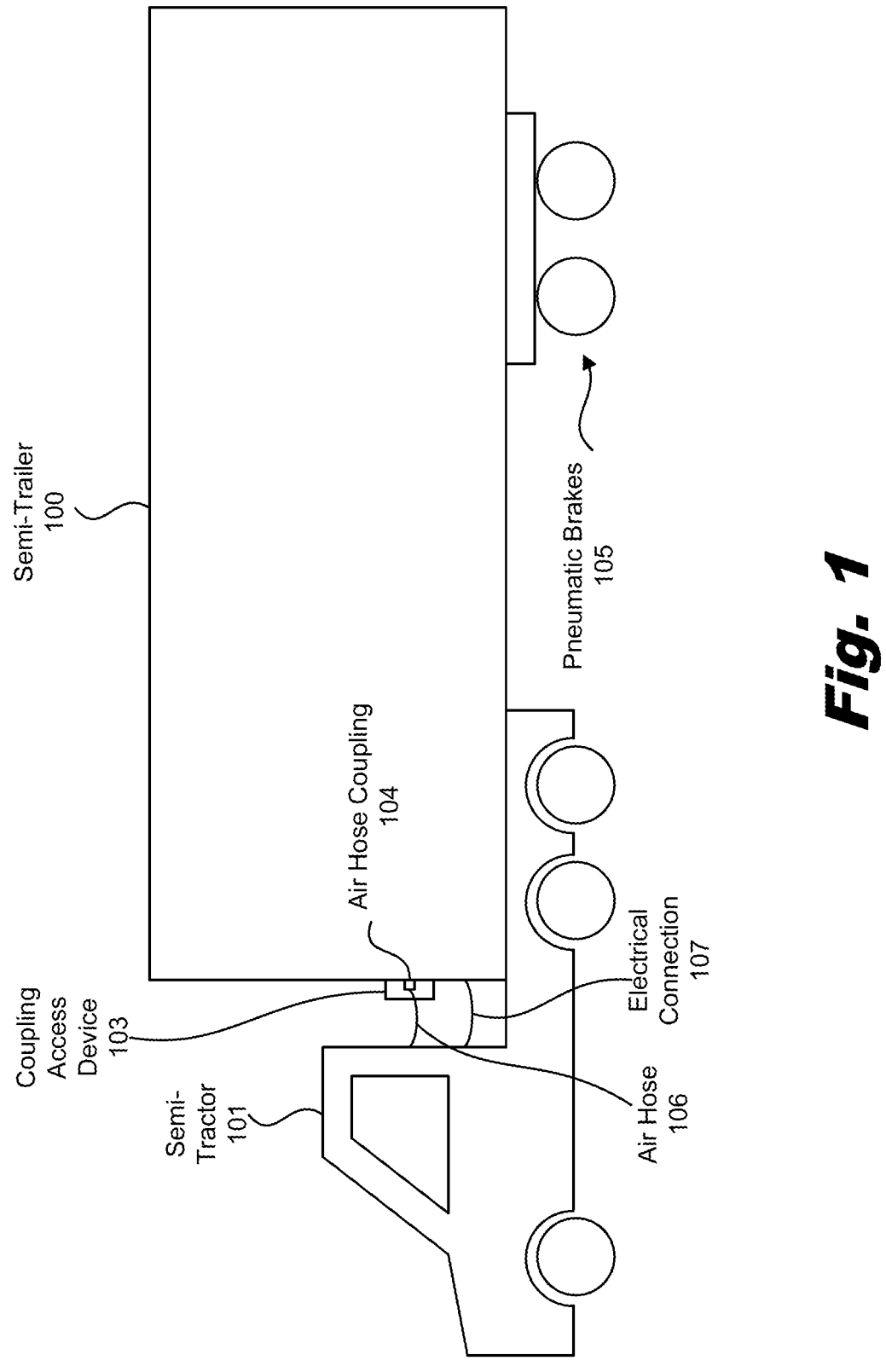
FIG. 1 illustrates a semi-trailer connected to a semi-tractor, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

SUMMARY

The present specification describes a method to provide access to a semi-trailer. The method includes 1) determining, by a controller on a semi-trailer, that a semi-trailer is authorized to connect to the semi-trailer; and 2) causing, by the controller, a lock device to disengage from a cover mechanism covering an air hose coupling for pneumatic brakes of the semi-trailer to allow the cover mechanism to move to an open position providing access to the air hose coupling.

The present specification further describes an example of a door access device for a semi-trailer. The example door access device includes a lock device to restrict access to a door of the semi-trailer, the lock device to be electrically actuated to lock and unlock the door. The example door access device also includes a controller to 1) determine that a semi-tractor has established an electrical connection with the semi-trailer; 2) determine that the semi-tractor is authorized to connect to the semi-trailer; and 3) actuate the lock device to unlock the door in response to determining that the semi-tractor is permitted to connect to the semi-trailer.

Using such a system and method: 1) provides a locking mechanism on a pneumatic connection between a semi-tractor and semi-trailer that unlocks if permission is granted; 2) the locking mechanism prevents the pneumatic connection such that the semi-trailer brakes cannot be unlocked by the buildup of air pressure in the air storage reservoir of the semi-trailer; 3) the locking mechanism is unlocked in response to a determination that the semi-tractor is permitted to connect to the semi-trailer; 4) blockchain may be used to determine that semi-tractor is permitted to connect to the semi-trailer; 5) a first computer in the semi-tractor verifies that the semi-tractor is permitted to connect to the semi-tractor, and a second computer in the semi-trailer verifies that the semi-trailer is permitted to connect to the semi-tractor; and/or 6) a door on the semi-trailer may be locked or unlocked based on whether the semi-tractor is permitted to connect to the semi-tractor.

DETAILED DESCRIPTION

The ability to ship goods across the globe is essential to the global economy we live in today. Different areas of the world specialize in producing different types of goods. For example, some locations have environmental conditions that enable the growth of certain produce. Other locations, while not suitable for certain produce, may be uniquely qualified to produce certain manufactured goods. The shipping industry allows these goods to be transported from where they are grown, produced or manufactured to locations across the globe where they are made available to consumers. Container ships transport the goods across the oceans, and cargo trucks, among other vehicles, transport the goods across the land.

In some examples, a semi-trailer is an unpowered vehicle that is towed by a semi-tractor. The semi-trailer may be used to transport goods and materials. In some examples, a semi-tractor supports a portion of the weight of the semi-trailer. For instance, a semi-trailer may include wheels to support the rear half of the semi-trailer, while the front half of the semi-trailer is supported by the semi-tractor.

In some examples, the security and safety of the cargo carried by a semi-trailer is a significant concern in the shipping industry. For example, a semi-trailer carrying valuable cargo may be a target for theft. In this case, a thief may attempt to connect a semi-tractor to an unattached semi-trailer so as to take the trailer and its cargo. In other examples, multiple semi-tractors may be used at different times, over different legs of a route, to transport a semi-trailer to a given destination. In these examples, it may be possible that the wrong semi-tractor may accidentally connect to the semi-trailer, which may result in the semi-trailer being transported to the wrong location. In this case, the resulting delay may lead to additional costs and may even result in the loss of the cargo (e.g., if the cargo is perishable).

As seen by these examples, it may be beneficial in various scenarios to provide an authentication process by which a semi-tractor connects to a semi-trailer. Consequently, the following describes coupling access devices for semi-trailers. A coupling access device may block access to an air hose coupling for the pneumatic brakes of the semi-trailer. the following description will also describe a system for controlling access to a semi-trailer using a door lock system that operated based on whether an authorized semi-tractor is connected.

In the example of a coupling access device, the device inserts a locking mechanism onto the pneumatic connection between a semi-tractor and semi-trailer such that, if permission is not granted, the pneumatic connection is physically prevented. By blocking the pneumatic connection, the semi-trailer brakes cannot be unlocked by the buildup of air pressure in the air storage reservoir of the semi-trailer. This locking mechanism is both physical (e.g., prevention of mechanical connection or prevention of air flow) and electrical (e.g., actuation of the prevention mechanism by way of the electrical connection between the semi-trailer and semi-tractor). In some examples, the coupling access device may be implemented as an electro-mechanical system controlled by a computer on the semi-tractor connected to a computer on the semi-trailer.

In the example of a door lock system a lock device controls access to the semi-trailer by operating a door lock at a door of the semi-trailer. The lock device can be electrically actuated to lock and unlock the door. The system also includes a controller to: determine that a semi-tractor has established an electrical connection with the semi-trailer; determine whether the semi-tractor is authorized to connect to the semi-trailer; and, in response to a determination that the semi-trailer is authorized to connect to the semi-trailer, actuate the lock device to unlock the door.

In some examples, the semi-tractor includes an air compressor accessory. The air compressor provides pressurized air to both the braking system of the semi-tractor and the braking system of the semi-trailer when connected properly. The semi-tractor also includes a source of electrical power specifically for the semi-trailer. This electrical power source is part of a standardized connection that every semi-tractor has. The electrical power source enables the semi-tractor to connect to any semi-trailer.

Unlocking the pneumatic flow to the semi-trailer may include the following. A computing device may be included on the semi-trailer that communicates to an on-board computer on the semi-tractor. When the standardized electrical connection is initially made between the semi-tractor and semi-trailer, the computer of the semi-trailer is initialized and powered for operation. The computer on the semi-tractor, also known as the electronic logging device (ELD), communicates with the computer on the semi-trailer. Both the semi-tractor and semi-trailer may have a secured electronic identification that can be exchanged over the connection. Based on the identification of the tractor and trailer, the computing device of the semi-trailer can determine whether this is an authorized or permitted connection between the semi-tractor and the semi-trailer. One method for determining whether the tractor/trailer connection is permitted is by using a blockchain ledger that records authorized tractor/trailer connections.

Once the determination is made that this is a permitted tractor/trailer connection, the coupling access device is unlocked so that a pneumatic connection can be made, and air can flow to the air storage tank on the semi-trailer. At the point, the air pressure is sufficient in the air storage tank, the semi-trailer brakes are unlocked, and the wheels are free to roll. Additionally or alternatively, when the determination is made that this is a permitted tractor/trailer connection, the computing device of the semi-trailer may operate the lock device to unlock the door of the semi-trailer.

When the electrical connection between the semi-tractor and semi-trailer is stopped, the coupling access device may return to a locked state once the physical connection between the pneumatic lines is disconnected, thus blocking access to the semi-trailer. It should be noted that the coupling access device is external to the air supply. Thus, the coupling access device may prevent a manual connection between the pneumatic lines of the semi-tractor and semi-trailer. However, air can still flow until the connection is manually disconnected.

In one specific example, a coupling access device for a semi-trailer, includes a cover mechanism to cover an air hose coupling for pneumatic brakes of the semi-trailer. The cover mechanism restricts access to the air hose coupling (also referred to a pneumatic line coupling) when in a closed position. The cover mechanism provides access to the air hose coupling when in an open position. The coupling access device also includes a lock device to engage the cover mechanism in the closed position. The coupling access device further includes a controller to actuate the lock device to allow the cover mechanism to transition from the closed position to the open position.

As used in the present specification and in the appended claims, the term "semi-tractor," "cargo tractor" or "tractor" refers to a towing engine that moves a trailered vehicle. In some examples, such a semi-tractor may be referred to as a tractor unit, a prime mover, or a semi-truck.

Further, as used in the present specification and in the appended claims, the term "semi-trailer," "cargo trailer" or "trailer" refers to a trailered vehicle that receives a load. In some examples, such a semi-trailer may be an enclosed semi-trailer. However, a semi-trailer may refer to any wheeled vehicle, whether powered or not, that is pulled by a semi-tractor.

Turning now to the figures, FIG. 1 illustrates a semi-trailer 100 connected to a semi-tractor 102, according to an example of the principles described herein. In this example, the semi-trailer 100 includes a coupling access device 103 that restricts or provides access to an air hose coupling 104 for pneumatic brakes 105 of the semi-trailer 100.

As described above, the pneumatic brakes 105 of the semi-trailer 100 may lock unless air pressure supplied by the semi-tractor 102 unlocks the pneumatic brakes 105. The pneumatic brakes 105 of the semi-trailer 100 are configured to remain locked unless air is provided at the air hose coupling 104 to unlock the pneumatic brakes 105. In other words, the pneumatic brakes 105 may default to a locked state unless air pressure is supplied to the pneumatic brakes.

The semi-trailer 100 includes an air hose coupling 104 (also referred to as a glad hand) to allow an air hose 106 from the semi-tractor 102 to connect to the semi-trailer 100. When the air hose 106 is connected to the air hose coupling of the semi-trailer 100, air pressure may build up in the air storage reservoir of the semi-trailer 100. Upon reaching a sufficient air pressure, the pneumatic brakes 105 of the semi-trailer 100 may unlock, allowing the semi-trailer 100 to move.

In some examples, an electrical connection 107 may be made between the semi-trailer 100 and the semi-tractor 102. The electrical connection 107 may allow the semi-trailer 100 to receive electrical power from the semi-tractor 102. In some examples, the electrical connection 107 also includes a data path such that the semi-trailer 100 may communicate with the semi-tractor 102 over the electrical connection 107. For example, the semi-tractor 102 may include a computing device (e.g., an ELD) that may communicate with the semi-trailer 100 over the electrical connection 107. In other examples, the semi-trailer 100 may communicate with the semi-tractor 102 using wireless communication (e.g., Wi-Fi, Bluetooth, etc.).

As will be described herein, the semi-trailer 100 includes a coupling access device 103 to restrict access to the air hose coupling 104. By blocking access to the air hose coupling 104, the semi-trailer 100 may remain immobilized. By providing access to the air hose coupling 104, an air hose connection may be established, which will unlock the pneumatic brakes 105.

The coupling access device 103 includes a controller that actuates a lock device. In some examples, the controller may unlock the lock device in response to determining that the semi-tractor 102 is authorized to connect to the semi-trailer 100.

Figure 2:
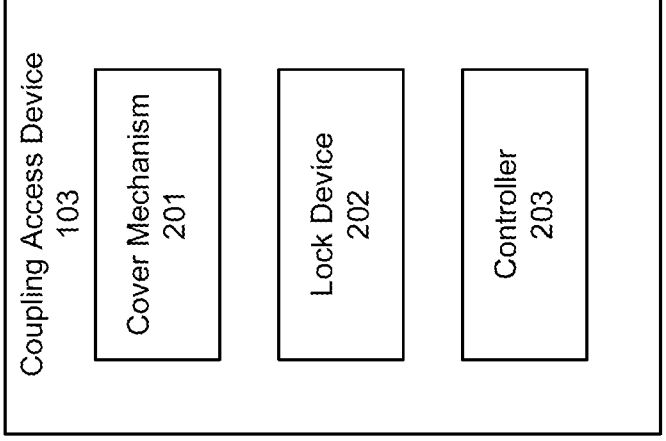
FIG. 2 is a block diagram illustrating an example of a coupling access device, according to an example.

Turning now to FIG. 2, the coupling access device 103 is described, according to an example. The coupling access device includes a cover mechanism 201 to cover the air hose coupling for the pneumatic brakes of the semi-trailer. In some examples, the cover mechanism 201 includes a plate to block access to the air hose coupling. The cover mechanism 201 may also include a bias mechanism (e.g., a spring) coupled to the plate to cause the plate to reside in the closed position unless an external force moves the plate to the open position.

The cover mechanism 201 may restrict access to the air hose coupling when in a closed position. For example, when in the closed position, the plate of the cover mechanism 201 may physically prevent an air hose 106 (FIG. 1) from the semi-trailer from connecting to the air hose coupling of the semi-trailer. In other words, the cover mechanism 201 may block access to the air hose coupling when the cover mechanism is in the closed position.

The cover mechanism 201 may provide access to the air hose coupling when in an open position. For example, when unlocked, the plate of the cover mechanism 201 may move out of the way of the air hose coupling. Thus, in the open position, the cover mechanism 201 may allow the air hose to connect to the air hose coupling.

The coupling access device 103 may include a lock device 202 to secure the cover mechanism 201 in the closed position. For example, the lock device 202 may be an electromagnetic lock. Examples of electromagnetic locks include an electromagnet that locks when provided an electric current. Thus, the lock device 202 may cause the cover of the coupling access device to remain in a close position while an electric current is provided to the lock device 202. In other examples, an electrical current may be needed to release a magnetic lock device that, without the current, is in a locked state. In other examples, the lock device may be an electromechanical device that actuates in response to an electrical signal but does not use a continuous electric current to remain engaged. Examples of this type of electromagnetic lock include electric strike locks that disengage the cover mechanism in response to an electric signal (e.g., electric current), but remain locked in the absence of the electric signal.

In some examples, the coupling access device 103 includes a controller 203 to actuate the lock device 202 to allow the cover mechanism to transition from the closed position to the open position. For example, the lock device 202 may engage the cover mechanism in the closed position in response to a first signal from the controller 203. The lock device 202 may disengage from the cover mechanism to allow the cover mechanism to move to the open position in response to a second signal from the controller 203.

In some examples, the controller 203 may receive a signal to unlock the cover mechanism 201. For example, the controller 203 may receive the signal from an external device (e.g., over a cloud connection). The signal may instruct the controller to unlock the cover mechanism. In some examples, the signal may be an indication that a semi-tractor is permitted or authorized to connect to the semi-trailer. The controller 203 may cause the lock device 202 to disengage from the cover mechanism in response to the signal.

In some examples, the controller may determine that a semi-tractor is permitted to connect to the semi-trailer. For example, an electrical connection may be made between the semi-tractor and the semi-trailer. In some examples, the electrical connection may be established with a standardized trailer connector (e.g., SAE J560 plug). The controller may determine that the electrical connection is established between a semi-tractor and the semi-trailer. The semi-tractor may identify itself using the electrical connection. For example, the controller may communicate with a computing device (e.g., the ELD) on the semi-tractor to determine the identity of the semi-tractor.

It should be noted that the electrical connection between the semi-trailer and the semi-tractor is to be made before a connection to the air hose coupling is established. For example, the cover mechanism of the coupling access device may block access to the air hose coupling. The controller may communicate with the semi-tractor using the electrical connection before determining whether to unlock the cover mechanism to provide access to the air hose coupling.

In some examples, the controller is configured to receive power from the semi-tractor over the electrical connection between the semi-tractor and the semi-trailer. For example, the controller may be powered by the semi-tractor via the electrical connection between the semi-tractor and the semi-trailer. In this case, the cover mechanism may remain in a locked state when the controller is unpowered. Once the controller receives power from the semi-tractor, the controller may determine whether the semi-tractor is permitted to connect to the semi-trailer. In some examples, the coupling access device may include a battery to power components of the coupling access device when the electrical connection with the semi-tractor is disconnected or otherwise disabled.

Using the identity of the semi-tractor, the controller may determine whether the semi-tractor is authorized to connect to the semi-trailer. For example, a connection database may indicate that the semi-tractor is authorized to connect to the semi-trailer. In some examples, the connection database may be stored on the coupling access device.

In some examples, the connection database may be located on a remote computing device. For example, the controller may communicate with a remote server to determine whether the semi-tractor is authorized to connect to the semi-trailer. In this case, the controller may send the semi-tractor identity to the remote server to verify whether the semi-tractor is permitted to connect to the semi-trailer. The remote server may send a signal indicating that the semi-tractor is authorized to connect to the semi-trailer.

In some examples, the controller may determine that the semi-tractor is authorized to connect to the semi-trailer based on a blockchain record for the semi-tractor. For example, a remote blockchain server may manage a blockchain record of whether the semi-tractor is permitted to connect to the semi-trailer. The controller may provide the semi-tractor identity to the blockchain server, which may verify whether the semi-tractor is permitted to connect to the semi-trailer. The blockchain server may report back to the controller whether the semi-tractor is permitted to connect to the semi-trailer. Therefore, the blockchain record may provide a secure match for a semi-tractor/semi-trailer association.

The controller may actuate the lock device to allow the cover mechanism to transition from the closed position to the open position in response to determining that the semi-tractor is permitted to connect to the semi-trailer. For example, the controller may send a signal to the lock device to disengage from the cover mechanism to allow the cover mechanism to move to an open position.

In some examples, the controller may determine that the electrical connection between the semi-tractor and the semi-trailer is terminated. For example, the electrical connection may be unplugged from the semi-trailer. The controller may cause the lock device to engage the cover mechanism in the closed position in response to determining that the electrical connection is terminated. For example, the controller may send a signal instructing the lock device to enter a locked state. It should be noted that when the electrical connection is terminated, the air hose may still be connected to the air hose coupling. To avoid unexpected braking, the pneumatic brakes may remain unlocked until the air hose is disconnected from the air hose coupling. Once the air hose is disconnected from the air hose coupling, the lock device may engage the cover mechanism in the closed position to restrict access to the air hose coupling.

Figure 3:
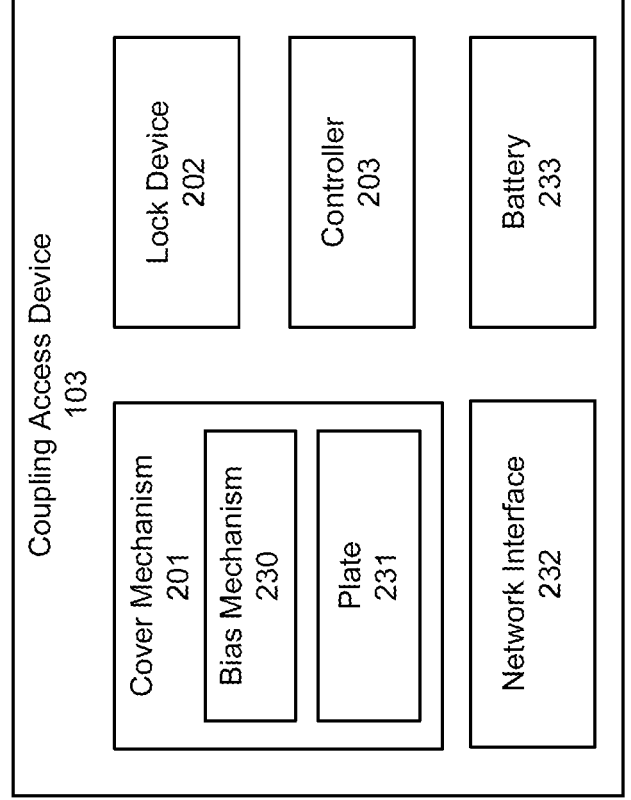
FIG. 3 is a block diagram illustrating another example of a coupling access device, according to an example.

FIG. 3 is a block diagram illustrating another example, with additional detail, of the coupling access device. In this example, the cover mechanism 201 includes a plate 231 to block access to the air hose coupling of the semi-trailer. In some examples, the plate 231 may be a lid, wall, box or other component of an enclosure surrounding the air hose coupling.

The cover mechanism 201 also includes a bias mechanism 230 coupled to the plate. The bias mechanism 230 exerts a force on the plate 231 to cause the plate 231 to reside in the closed position unless an external force (e.g., a human hand pulling force) moves the plate 231 to the open position. Examples of the devices that may be used to implement the bias mechanism include springs (e.g., coil spring, leaf spring, compression spring, tension spring, etc.), magnets, and elastic materials.

The coupling access device 103 also includes a lock device 202 and controller 203, which may be implemented as described in FIG. 2. For example, the controller may actuate the lock device to engage/disengage the plate of the cover mechanism based on whether a semi-tractor is authorized to connect to the semi-trailer.

In some examples, the coupling access device 103 includes a network interface 232. The network interface 232 may receive a signal to unlock the cover mechanism 201. The controller 203 may communicate with a computing device of the semi-tractor via the network interface 232. The controller 203 may also communicate with a remote computing device (e.g., a cloud-based server) using the network interface. Examples of the network interface 232 include a wireless network interface or a wired network interface. As described above, the network interface 232 may be used to access blockchain records to verify the authorization of a semi-tractor to connect to the semi-trailer.

In the case of a wired network interface, the network interface 232 of the coupling access device 103 may communicate with a computing device of the semi-tractor using the electrical connection between the semi-trailer and the semi-tractor. In another example, a separate wired communication line may be established between the semi-trailer and the semi-tractor.

For a wireless network interface, the network interface may communicate using wireless signals (e.g., radio frequency signals). For example, the network interface may be a cellular interface (e.g., using a mobile communication network), a Bluetooth interface, a Wi-Fi interface, a ZigBee interface, etc.

In some examples, the network interface of the coupling access device may use communication systems of the semi-tractor to communicate with remote servers. For example, the controller may receive the semi-tractor identity from the semi-tractor via the network interface. The controller may generate an encrypted message that includes the semi-tractor identity and the semi-trailer identity. The controller may send the encrypted message to the semi-tractor, which forwards the encrypted message to a remote server to authenticate whether the semi-tractor is permitted to connect to the semi-trailer. The remote server may send a response (e.g., an encrypted response) back to the semi-tractor, which forwards the response to the controller of the coupling access device. The controller may then unlock the cover mechanism based on the response from the remote server.

In some examples, the coupling access device may include multiple wireless network interfaces. For example, a first wireless network interface may be used by the controller and a second wireless network interface may be used by the lock device. The controller may send wireless signals to the lock device to actuate the lock device.

In some examples, the coupling access device 103 includes a battery 233 to provide power to the coupling access device 103. For example, the battery 233 may provide power to the lock device 202. In the case that the lock device is an electromagnetic lock, the battery may supply an electric current to keep the lock device in a locked state with the plate of the cover mechanism in the event that electrical power from the semi-tractor is terminated. In some examples, the battery may be recharged while the semi-trailer is connected to the electrical connection of the semi-tractor.

Figure 4:
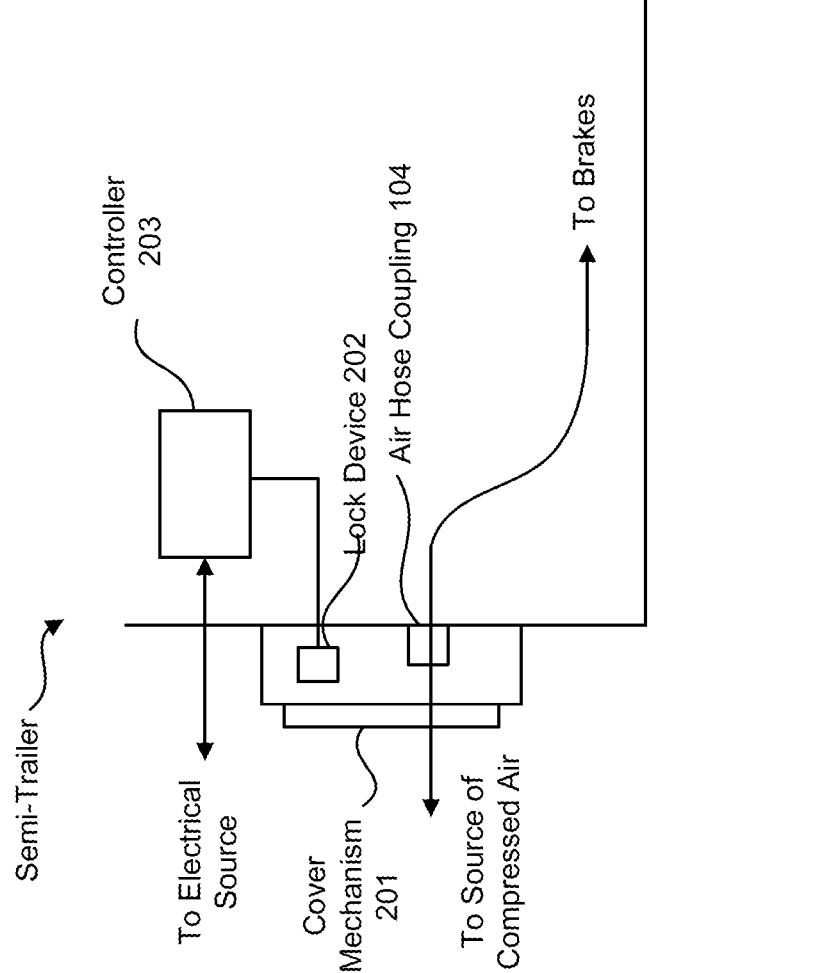
FIG. 4 is a schematic illustrating components of the coupling access device and semi-trailer, according to an example.

FIG. 4 is a schematic illustrating components of the coupling access device and semi-trailer, according to an example. The controller may connect to an electrical source. For example, the controller may connect to the electrical connection between the semi-trailer and a semi-tractor.

The controller may couple to a lock device. The controller may signal the lock device to unlock a cover mechanism that blocks access to an air hose coupling of the semi-trailer. Once unlocked, the cover mechanism may be moved to provide access to the air hose coupling. An air hose from the semi-tractor may be connected to the air hose coupling. The semi-tractor may provide a source of compressed air to unlock the brakes of the semi-trailer.

Figure 5:
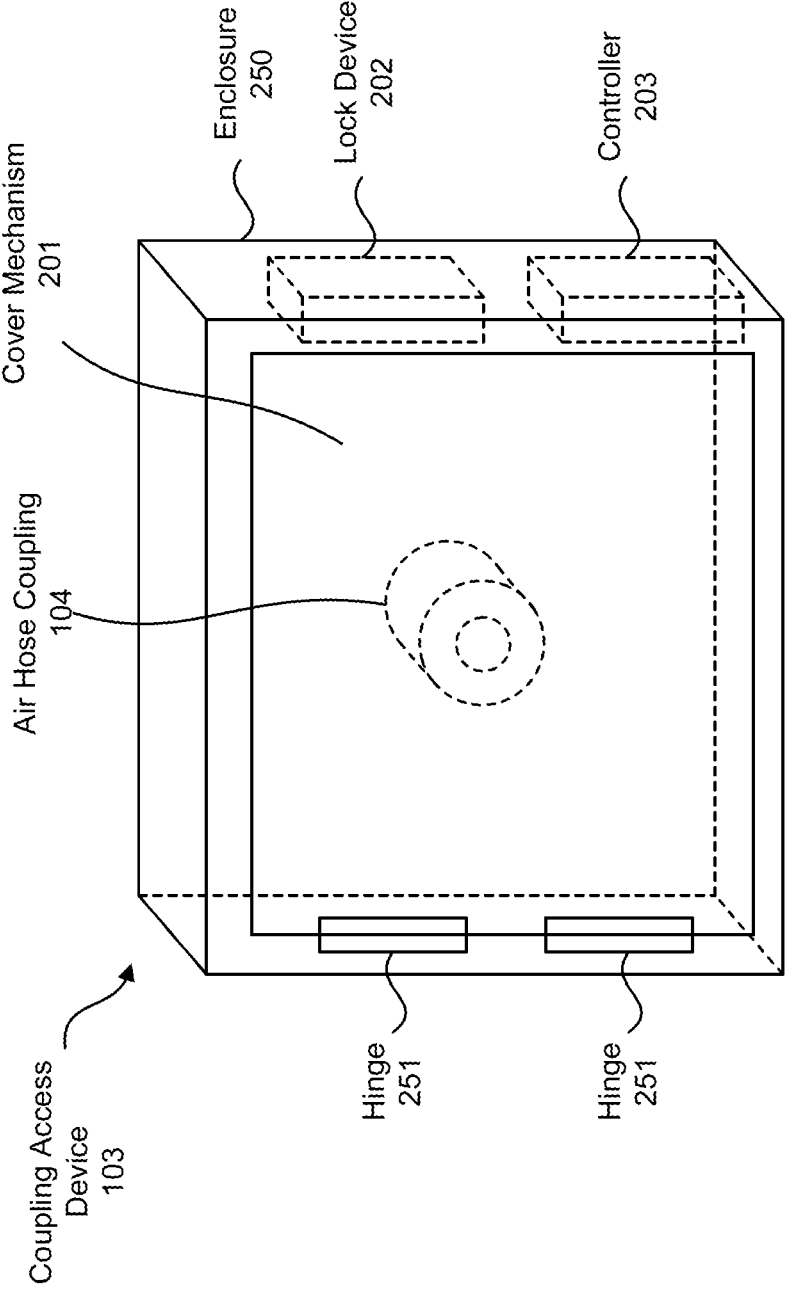
FIG. 5 illustrates an example of the coupling access device.

FIG. 5 illustrates another example of the coupling access device 103. In this example, the coupling access device includes an enclosure 250 surrounding an air hose coupling 104 of a semi-trailer.

In this example, a controller 203 is located within the enclosure 250. It should be noted that in other implementations, the controller may be located outside the enclosure or in a location removed from the enclosure.

The enclosure 250 includes a cover mechanism 201 that blocks access to the air hose coupling 104. In this case, the cover mechanism 201 is a plate that connects to the sides of the enclosure using hinges 251. The hinges 251 allow the cover mechanism 201 to pivot between a closed position and an open position.

A lock device 202 is housed within the enclosure 250. The lock device 202 may selectively engage the cover mechanism 201 in the closed position. For example, the lock device 202 selectively engage the cover mechanism 201 to secure the cover mechanism in the closed position. In some examples, the lock device 202 may include a physical component to interface with the cover mechanism when in the closed position. When instructed by the controller to unlock, the lock device may retract the physical component to allow the cover mechanism to move to the open position. In some examples, the lock device may be an electromagnetic lock that retains the cover mechanism in the closed position using a magnetic field.

Figures 6A, 6B:
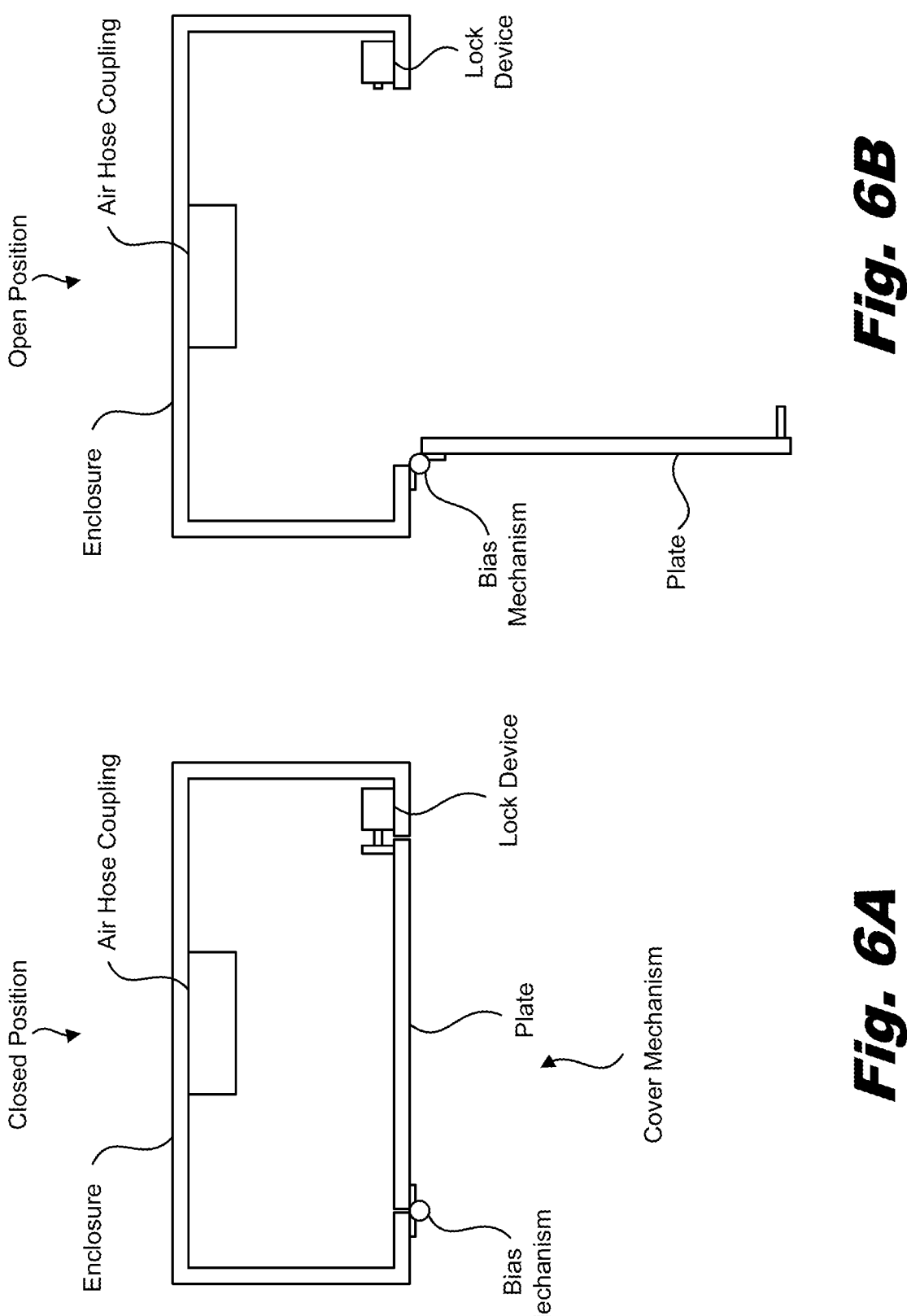
FIGS. 6A and 6B illustrate the coupling access device in a closed position and an open position, according to an example.

FIGS. 6A and 6B illustrate the coupling access device in a closed position and an open position. In FIGS. 6A and 6B, an enclosure as described in FIG. 5 may be located at an air hose coupling.

In FIG. 6A, the cover mechanism includes a plate that is held in the closed position by the lock device. While in the closed position, the plate of the cover mechanism blocks access to the air hose coupling.

In FIG. 6B, the lock device is actuated to disengage from the plate of the cover mechanism. The plate is moved to the open position to provide access to the air hose coupling. A bias mechanism may exert a force on the plate to cause the plate to return to the closed position.

Figure 7:
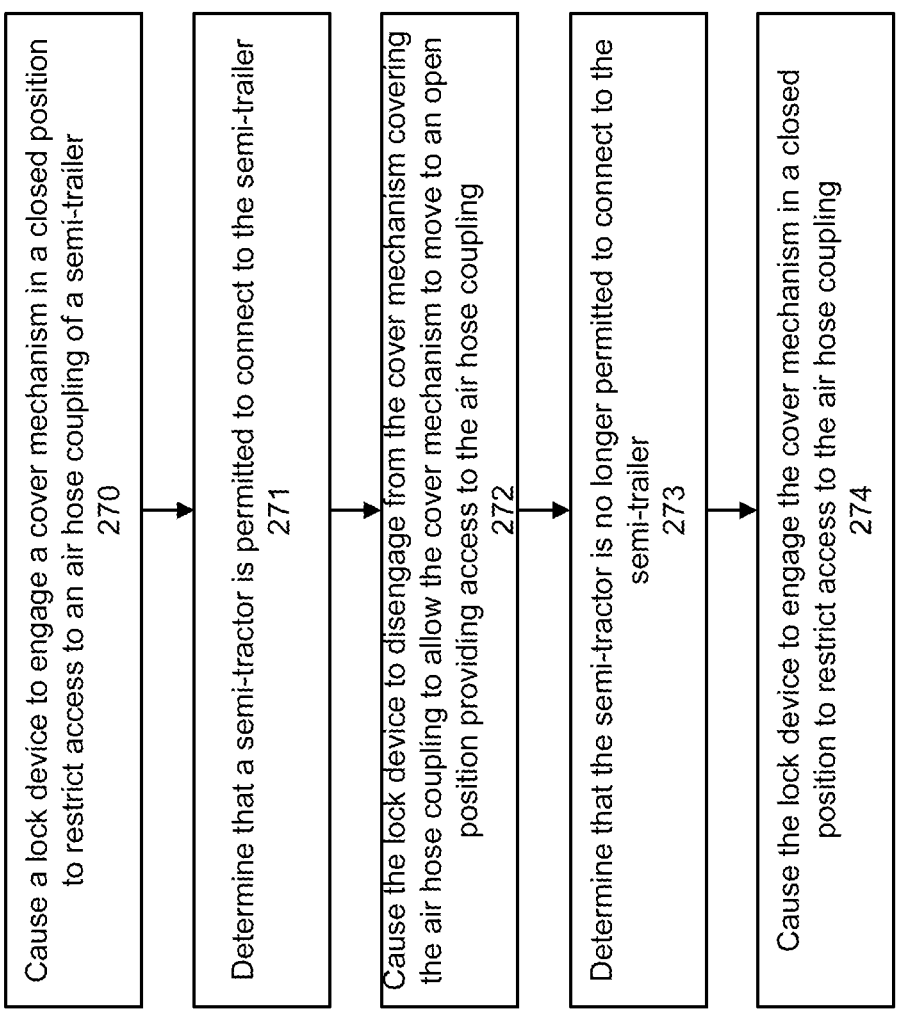
FIG. 7 is a flow diagram illustrating a method to provide access to an air hose coupling for pneumatic brakes of a semi-trailer, according to an example.

FIG. 7 is a flow diagram illustrating a method to provide access to an air hose coupling for pneumatic brakes of a semi-trailer, according to an example. The method may be implemented by a controller of a coupling access device.

The controller may cause 270 a lock device to engage a cover mechanism in a closed position to restrict access to the air hose coupling of the semi-trailer. For example, the controller may send a first signal to the lock device to engage the cover mechanism in the closed position.

The controller may determine 271 that a semi-tractor is authorized to connect to the semi-trailer. For example, an electrical connection may be made between the semi-trailer and the semi-tractor. The controller may receive semi-tractor identity data using the electrical connection. The controller may then verify whether the semi-tractor is permitted to connect to the semi-trailer. For example, the controller may send a request to a blockchain server to verify whether the semi-tractor is permitted to connect to the semi-trailer. In this case, the controller determines that the semi-tractor is permitted to connect to the semi-trailer.

The controller may cause 272 the lock device to disengage from the cover mechanism covering the air hose coupling to allow the cover mechanism to move to an open position providing access to the air hose coupling. For example, the controller may send a second signal to the lock device to disengage (e.g., unlock) the cover mechanism.

At some point, the controller may determine 273 that the semi-tractor is no longer authorized to connect to the semi-trailer. For example, the controller may receive a signal from a remote server instructing the controller that the semi-tractor is no longer permitted to connect to the semi-trailer. In another example, the electrical connection between the semi-tractor and the semi-trailer may be terminated. In yet another example, a given time period for allowing access to the semi-tractor may expire.

The controller may cause 274 the lock device to engage the cover mechanism in a closed position to restrict access to the air hose coupling. In some examples, the controller may cause the lock device to enter a lock state. Once the air hose is removed from the air hose coupling, the cover mechanism may return to the closed position. The lock mechanism may then retain the cover mechanism in the closed position.

Figure 8:
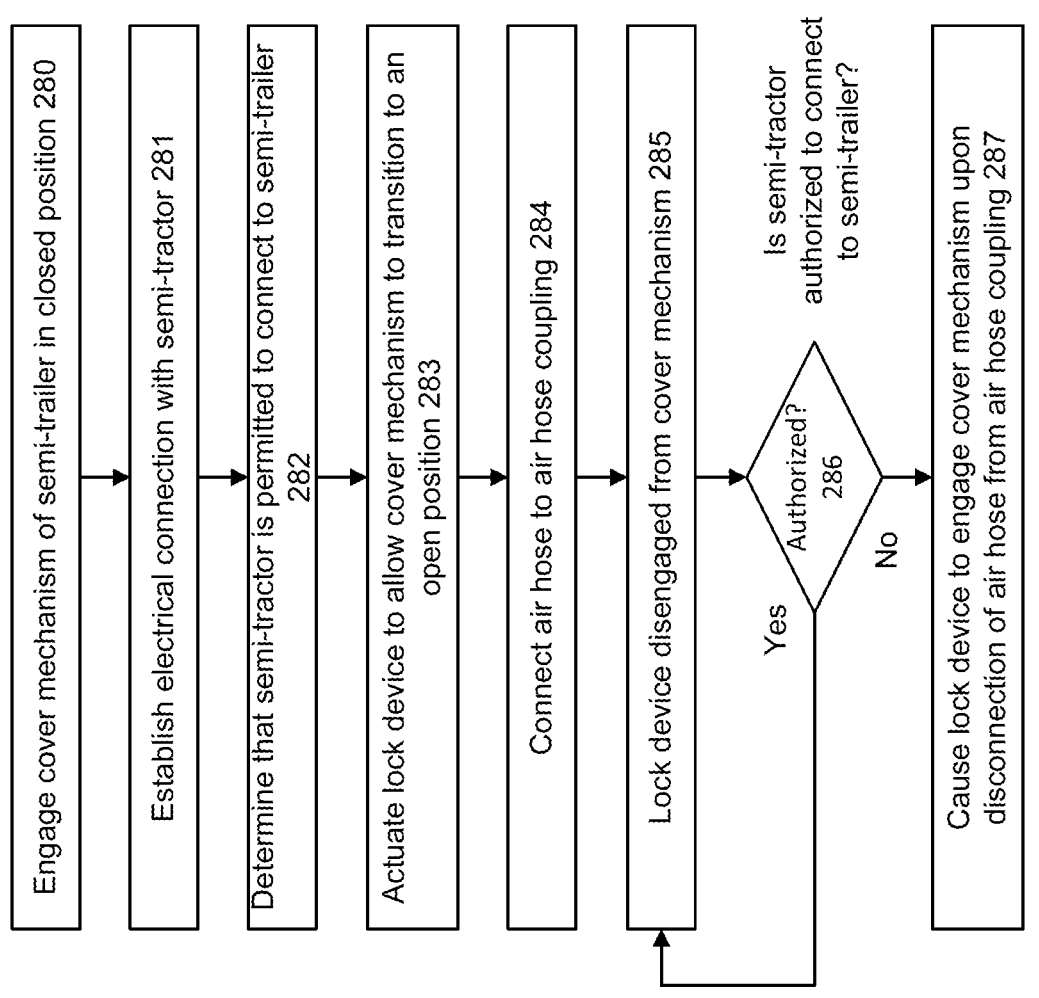
FIG. 8 is a flow diagram illustrating another method to provide access to an air hose coupling for pneumatic brakes of a semi-trailer, according to an example.

FIG. 8 is a flow diagram illustrating another method to provide access to an air hose coupling for pneumatic brakes of a semi-trailer, according to an example. The lock device of a coupling access device may engage 280 a cover mechanism in a closed position. While in the closed position, the cover mechanism may block access to the air hose coupling.

An electrical connection may be established 281 between the semi-trailer and a semi-tractor. A controller of the coupling access device may determine 282 that the semi-tractor is permitted to connect to the semi-trailer. As used herein "permitted to connect to the semi-trailer" refers to establishing a connection with the air hose coupling to unlock the pneumatic brakes of the semi-trailer, thus allowing the semi-trailer to move. In some examples, the controller may send identity information for the semi-tractor and the semi-trailer to a remote server to determine whether the semi-tractor is permitted to connect to the semi-trailer.

Upon determining that the semi-tractor is permitted to connect to the semi-trailer, the controller may actuate 283 the lock device to allow the cover mechanism to transition to an open position. Once in the open position, access to the air hose coupling may be provided.

An air hose may be connected 284 to the air hose coupling. While the air hose is connected to the air hose coupling, the lock device may be disengaged 285 from the cover mechanism.

The controller may determine 286 whether the semi-tractor is still authorized to connect to the semi-trailer. For example, the controller may receive a signal from a remote server instructing the controller that the semi-tractor is no longer permitted to connect to the semi-trailer. In another example, the electrical connection between the semi-tractor and the semi-trailer may be terminated. In yet another example, a given time period for allowing access to the semi-tractor may expire. If the semi-tractor is permitted to remain connected to the semi-trailer, then the controller may instruct the lock device to remain disengaged from the cover mechanism. If the semi-tractor is not permitted to remain connected to the semi-trailer, then the controller may cause 287 the lock device to engage the cover mechanism upon disconnection of the air hose from the air hose coupling.

Figure 9:
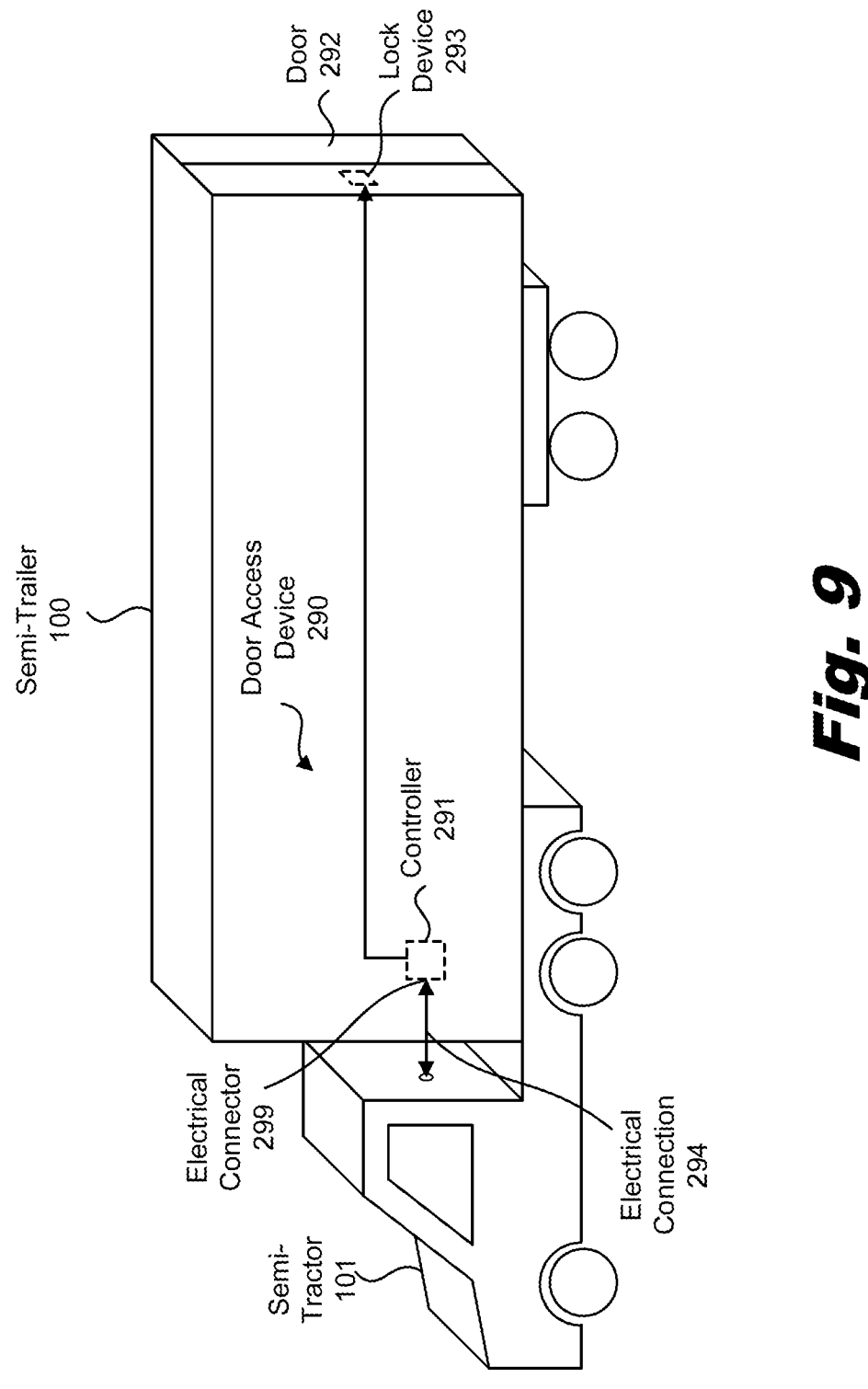
FIG. 9 illustrates a semi-trailer with a door access device, according to an example of the principles described herein.

FIG. 9 illustrates a semi-trailer with a door access device, according to an example of the principles described herein. As discussed above, the semi-trailer 100 may connect to a semi-tractor 101. The semi-trailer 100 may include a door access device 290 to selectively provide access to the interior of the semi-trailer 100 through a door 292 of the semi-trailer. Access is provided based on whether the semi-tractor 101 is authorized to connect the semi-trailer 100.

In some examples, the door access device 290 includes a lock device 293 to control access via the door 292 of the semi-trailer 100. The lock device 293 may be electrically actuated to lock and unlock the door 292. The lock device 293 may be implemented as discussed above with the example of a physical latch or other coupling engagement to physically engage to prevent the door 292 from being opened. In this case, the physical latch or coupling engagement of the lock device 293 may be moved by an electronic actuator to lock or unlock the door 292 of the semi-trailer 100 in response to a signal from the controller 291.

In some examples, the controller 291 may be implemented as discussed above with the example of the coupling access device. For example, the controller 291 may be located on the semi-trailer 100. The controller 291 can send an actuation signal to the lock device 293 to cause the lock device 293 to lock or unlock the door 292.

In some examples, the controller 291 may actuate the lock device 293 to lock and unlock the door based on whether the semi-tractor 101 is identified as authorized to connect to the semi-trailer 100. In this case, the controller 291 may determine that a semi-tractor 101 has established an electrical connection 294 with the semi-trailer 100. For example, when an operator establishes an electrical connection 294 between the semi-tractor and the semi-trailer, an electrical connector 299 of the controller 291 may receive an electrical signal from the semi-tractor 101 indicating that the electrical connection 294 has been made.

In some examples, the semi-tractor 101 may identify itself to the controller 291 using the electrical connection. For example, the controller 291 may communicate with a computing device (e.g., the ELD) on the semi-tractor 101 to determine the identity of the semi-tractor.

The controller 291 may determine that the semi-tractor 101 is authorized to connect to the semi-trailer 100 as follows. For example, using the identity of the semi-tractor 101 received over the electrical connection 294, the controller 291 can determine whether the semi-tractor is authorized to connect to the semi-trailer. This may be accomplished as described above. For example, the controller 291 may use a network interface (e.g., 232, FIG. 3) to communicate with a connection database that catalogs authorized connections between tractors and trailers. This connection database may indicate that the semi-tractor 101 is authorized to connect to the semi-trailer 100 based on the identification of both the tractor and trailer. In some examples, the controller 291 may not need a network interface to check on authorization of the tractor. In such an example, the connection database may be stored on the coupling access device 103.

One method for determining whether the tractor/trailer connection is authorized is by using a blockchain ledger that records permitted tractor/trailer connections. In such a blockchain-based system, each semi-tractor and semi-trailer is assigned a unique digital identity, securely stored on the blockchain. When the time comes for a semi-tractor and a semi-trailer to be connected, a transaction is initiated on the blockchain. This transaction includes the digital identities of both the semi-tractor and the semi-trailer involved in the connection. By recording this information on the blockchain, a transparent and tamper-proof record is created.

To ensure the legitimacy of the transaction, the blockchain network relies on a consensus mechanism. This mechanism involves a network of computers, known as nodes, that collectively validate and verify the transaction. This decentralized approach eliminates the need for a central authority and enhances the security of the system. Once the transaction is validated and confirmed by the blockchain network, it becomes a permanent record on the ledger. This record serves as a testament to the authorized connection between the specific semi-tractor and semi-trailer. Any attempts to tamper with or modify this record are instantly detected by the network, thanks to the cryptographic security measures inherent in blockchain technology.

Stakeholders, such as logistics companies, law enforcement agencies, and cargo owners, can access the blockchain ledger in real-time. They can monitor and verify the authorized connections, ensuring that only the right semi-tractors are attached to the corresponding semi-trailers. This real-time monitoring provides an extra layer of security and reduces the risk of theft or misdirection. If an unauthorized semi-tractor attempts to connect with a semi-trailer, the transaction is deemed invalid during the consensus process. As a result, the unauthorized connection is not recorded on the blockchain. This proactive measure prevents theft or misdirection, as only authorized connections are recognized and accepted.

Moreover, the blockchain ledger offers comprehensive traceability and auditability. Stakeholders can track the movement of semi-tractors and semi-trailers throughout their journey, identifying any potential security breaches or discrepancies. Disputes can be resolved efficiently, as the immutable nature of the blockchain provides an indisputable record of authorized connections. By harnessing the power of blockchain technology, the logistics industry is revolutionized. The blockchain ledger ensures that only authorized semi-tractors are connected to specific semi-trailers, preventing theft or misdirection of cargo. Thus, the controller may determine that the semi-tractor is permitted to connect to the semi-trailer based on a blockchain record for the semi-tractor and the semi-trailer.

The controller 291 may actuate the lock device 293 to unlock the door 292 in response to determining that the semi-tractor 101 is permitted to connect to the semi-trailer 100. For example, upon determining that the semi-tractor is permitted to connect to the semi-trailer, the controller 291 may send a signal to the lock device 293 that causes the lock device 293 to unlock the door 292. In some examples, the door 292 may remain unlocked (by the lock device) while the controller 291 continues to determine that the semi-tractor is permitted to connect to the semi-trailer. In some examples, the controller 291 may actuate the lock device 293 to lock the door 292 in response to determining that the semi-tractor 101 is not permitted to connect to the semi-trailer 100. For example, if the database (e.g., the blockchain ledger) indicates that the semi-tractor is not permitted to connect to the semi-trailer, then the controller 291 may instruct the lock device 293 to lock the door 292.

In some examples, the controller 291 may actuate the lock device 293 to lock the door 292 in response to determining that the electrical connection 294 is terminated. For example, if an operator disconnects the electrical connection between the semi-tractor and the semi-trailer, then the controller 291 may instruct the lock device 293 to lock the door 292.

In some examples, the controller 291 may further actuate the lock device 293 to lock and unlock the door 292 based on a remote authorization signal received at the controller 291. In this case, the door 292 can be controlled (e.g., locked or unlocked) on command remotely and not only because the connection between the tractor and trailer is a permitted connection. Upon verifying that the semi-tractor is permitted to connect to the semi-trailer, the controller 291 may continue to keep the door locked until a remote authorization signal is received at the controller. For example, an authorizing entity (e.g., a manager) may receive a notification that an accessing entity (e.g., a driver or other party) is attempting to access the cargo area of the semi-trailer via the door. The authorizing entity (e.g., the manager) may send the remote authorization signal to the controller 291 to authorize unlocking the door 292. Upon receiving the remote authorization signal, the controller 291 may send a signal to the lock device 293 to unlock the door 292. Thus, the cargo door may remain locked until the authorizing entity (e.g., a manager) sends the remote authorization signal to unlock the door.

In this example, there are two conditions to unlock the door 292 of the semi-trailer 100. The first condition is for the controller 291 to determine that the connection between semi-tractor 101 and the semi-trailer 100 is permitted. The second condition is for the controller 291 to receive a remote authorization signal indicating that the accessing entity (e.g., the driver or other entity) is authorized to open the door 292. If either of these conditions fail to be met, then the controller 291 may cause the lock device 293 to lock or maintain a locked state of the door 292.

In some examples, the accessing entity may send a request to access the door. In an example approach, the semi-tractor 101 may include a user interface (referred to herein as an access request interface) to allow the accessing entity to send a request to the authorizing entity. For example, the semi-tractor 101 may include a computer graphical user interface or an analog interface (e.g., a button) that the accessing entity may engage to send the access request. In some examples, the accessing entity may use a mobile computing device (e.g., a smartphone) to send the access request.

In some examples, the access request interface is activated in response to a determination that the connection between the semi-tractor and semi-trailer is authorized. For example, the controller 291 of the semi-trailer or a computing device of the semi-tractor may disable the access request interface unless an authorized connection to the semi-trailer is made. Once a permitted connection to the semi-trailer is made, the controller 291 of the semi-trailer or the semi-tractor computing device may enable the access request interface to allow the accessing entity (e.g., the driver) to send an access request to unlock the door 292.

FIG. 10 is a flow diagram illustrating a method to provide access to a door of a semi-trailer, according to an example of the principles described herein. A controller of the semi-trailer may determine 295 that a semi-tractor has established an electrical connection with a semi-trailer. The controller may determine 296 that the semi-tractor is permitted to connect to the semi-trailer. The controller may receive 297 a remote authorization signal to unlock a door of the semi-trailer. The controller may actuate 298 a lock device of the semi-trailer in response to determining that the semi-tractor is permitted to connect to the semi-trailer and receiving the remote authorization signal.

The invention claimed is:

1. A coupling access device for a semi-trailer, comprising:
   a cover mechanism to cover an air hose coupling for pneumatic brakes of the semi-trailer, the cover mechanism to restrict access to the air hose coupling when in a closed position, and the cover mechanism to provide access to the air hose coupling when in an open position;
   a lock device to engage the cover mechanism in the closed position; and
   a controller to actuate the lock device to allow the cover mechanism to transition from the closed position to the open position;
   wherein the controller is to actuate the lock device to allow opening of the cover mechanism only in response to a determination that a connected semi-tractor is authorized to connect to the semi-trailer.

2. The coupling access device of claim 1, wherein the cover mechanism comprises a plate to block access to the air hose coupling.

3. The coupling access device of claim 2, wherein the cover mechanism further comprises a bias mechanism coupled to the plate to cause the plate to reside in the closed position unless an external force moves the plate to the open position.

4. The coupling access device of claim 1, wherein the pneumatic brakes of the semi-trailer are configured to remain locked unless air is provided at the air hose coupling to unlock the pneumatic brakes.

5. The coupling access device of claim 1, wherein the lock device is to:
   engage the cover mechanism in the closed position in response to a first signal from the controller; and
   disengage from the cover mechanism to allow the cover mechanism to move to the open position in response to a second signal from the controller.

6. The coupling access device of claim 1, wherein the controller is to:
   determine that a semi-tractor is permitted to connect to the semi-trailer; and
   actuate the lock device to allow the cover mechanism to transition from the closed position to the open position in response to determining that the semi-tractor is permitted to connect to the semi-trailer.

7. The coupling access device of claim 6, wherein the controller is to:
   determine that the semi-tractor is permitted to connect to the semi-trailer by communicating with a remote server.

8. The coupling access device of claim 6, wherein the controller is to communicate with a computing device on the semi-tractor to determine that semi-tractor is permitted to connect to the semi-trailer.

9. The coupling access device of claim 1, wherein the controller is to:
   determine that an electrical connection is established between a semi-tractor and the semi-trailer.

10. The coupling access device of claim 9, wherein the electrical connection is to be made before a connection to the air hose coupling.

11. The coupling access device of claim 10, wherein the controller is configured to receive power from the semi-tractor over the electrical connection between the semi-tractor and the semi-trailer.

12. The coupling access device of claim 9, wherein the controller is to:
   determine that the electrical connection between the semi-tractor and the semi-trailer is terminated; and
   cause the lock device to engage the cover mechanism in the closed position in response to determining that the electrical connection is terminated.

13. The coupling access device of claim 1, wherein the lock device is to:
   engage the cover mechanism to restrict access to the air hose coupling upon disconnection of an air hose from the air hose coupling.

14. The coupling access device of claim 1, further comprising a network interface to receive a signal to unlock the cover mechanism.

15. The coupling access device of claim 1, wherein the lock device comprises an electromagnetic lock.

16. The coupling access device of claim 15, further comprising a battery to power the electromagnetic lock.

17. A method, comprising:
   determining, by a controller on a semi-trailer, that a semi-tractor is authorized to connect to the semi-trailer; and, in response to determining that the semi-tractor is authorized to connect to the semi-trailer, causing, by the controller, a lock device to disengage from a cover mechanism covering an air hose coupling for pneumatic brakes of the semi-trailer to allow the cover mechanism to move to an open position providing access to the air hose coupling;

wherein the controller is to actuate the lock device to allow opening of the cover mechanism only in response to the determination that the semi-tractor is authorized to connect to the semi-trailer.

18. The method of claim 17, further comprising:

determining, by the controller, that the semi-trailer is no longer permitted to connect to the semi-trailer; and causing, by the controller, the lock device to engage the cover mechanism in a closed position to restrict access to the air hose coupling.

19. The method of claim 17, further comprising determining whether the semi-tractor is authorized to connect to the semi-trailer using an electrical connection between the semi-tractor and semi-trailer.

\* \* \* \* \*